US010055004B2

(12) United States Patent
Omata et al.

(10) Patent No.: US 10,055,004 B2
(45) Date of Patent: Aug. 21, 2018

(54) REDUNDANT SYSTEM AND REDUNDANT SYSTEM MANAGEMENT METHOD

(71) Applicant: HITACHI, LTD., Tokyo (JP)

(72) Inventors: Kazuhiko Omata, Tokyo (JP); Nobutaka Okamoto, Tokyo (JP); Takafumi Jinsenji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/024,907

(22) PCT Filed: Jan. 10, 2014

(86) PCT No.: PCT/JP2014/050354
§ 371 (c)(1),
(2) Date: Mar. 25, 2016

(87) PCT Pub. No.: WO2015/104841
PCT Pub. Date: Jul. 16, 2015

(65) Prior Publication Data
US 2016/0349830 A1 Dec. 1, 2016

(51) Int. Cl.
*G06F 1/32* (2006.01)
*G06F 1/26* (2006.01)
(Continued)

(52) U.S. Cl.
CPC .............. *G06F 1/3287* (2013.01); *G06F 1/26* (2013.01); *G06F 1/28* (2013.01); *G06F 1/3228* (2013.01);
(Continued)

(58) Field of Classification Search
CPC .............. G06F 11/2023; G06F 11/2038; G06F 11/2033; G06F 11/2041; G06F 11/20;
(Continued)

(56) References Cited

U.S. PATENT DOCUMENTS 4,912,708 A * 3/1990 Wendt ................. G06F 11/0757
714/55
5,491,788 A * 2/1996 Cepulis ............... G06F 11/1417
714/13
(Continued)

FOREIGN PATENT DOCUMENTS

CN 102332751 A 1/2012
CN 102902615 A 1/2013
(Continued)

OTHER PUBLICATIONS

International Search Report of PCT/JP2014/050354 dated Mar. 18, 2014.
(Continued)

*Primary Examiner* — Ji H Bae
(74) *Attorney, Agent, or Firm* — Mattingly & Malur, PC

(57) ABSTRACT

A redundant system is provided with a redundant failure detection configuration, and thereby is enabled to precisely detect a failure occurrence, and reliably execute a necessary system switching operation. In a redundant system 10, each of power supply mechanisms 200 for computers 150, 180 redundantly provided includes a processor 204 configured to: monitor a write process in which predetermined information from another apparatus 300 or another mechanism 112 of the corresponding computer 150 or 180 is written to a storage 201 of the power supply mechanism 200; execute an operation of powering off or resetting a power supply device 230 if the write process is not in conformity with a predetermined rule; and after the execution of the operation, give an instruction to perform a fail-over operation to the other computer out of the computers 150, 180.

12 Claims, 11 Drawing Sheets

(51) Int. Cl.
*G06F 11/16* (2006.01)
*G06F 11/18* (2006.01)
*G06F 11/20* (2006.01)
*G06F 11/30* (2006.01)
*G06F 11/14* (2006.01)
*G06F 1/28* (2006.01)

(52) U.S. Cl.
CPC .......... *G06F 11/1441* (2013.01); *G06F 11/16* (2013.01); *G06F 11/18* (2013.01); *G06F 11/20* (2013.01); *G06F 11/2028* (2013.01); *G06F 11/2033* (2013.01); *G06F 11/30* (2013.01); *G06F 11/2023* (2013.01); *G06F 11/2038* (2013.01); *G06F 11/2041* (2013.01)

(58) Field of Classification Search
CPC ........ G06F 1/3287; G06F 1/26; G06F 1/3228; G06F 11/1441; G06F 11/16; G06F 11/18; G06F 11/2028; G06F 11/30
USPC .................................. 713/323; 714/4.11, 48
See application file for complete search history.

(56) References Cited

U.S. PATENT DOCUMENTS

| | | | | |
|---|---|---|---|---|
| 5,961,622 | A * | 10/1999 | Hudson | G06F 11/0757 710/107 |
| 6,952,785 | B1 * | 10/2005 | Diab | G06F 1/26 370/244 |
| 2003/0053811 | A1 | 3/2003 | Takayama | |
| 2003/0061548 | A1 * | 3/2003 | O'Gorman | G06F 11/08 714/43 |
| 2005/0141300 | A1 | 6/2005 | Kozakai et al. | |
| 2005/0172161 | A1 | 8/2005 | Cruz et al. | |
| 2006/0221817 | A1 * | 10/2006 | Nishida | G06F 11/004 370/216 |
| 2010/0011242 | A1 * | 1/2010 | Baba | G06F 11/2028 714/11 |
| 2012/0151248 | A1 * | 6/2012 | Bower, III | G06F 1/30 714/4.11 |
| 2013/0185582 | A1 | 7/2013 | Tsukamoto et al. | |
| 2013/0205162 | A1 | 8/2013 | Hirose et al. | |
| 2015/0006943 | A1 | 1/2015 | Suzuki | |
| 2015/0242266 | A1 * | 8/2015 | Kori | G06F 11/0721 714/57 |

FOREIGN PATENT DOCUMENTS

| | | |
|---|---|---|
| JP | 06-180690 A | 6/1994 |
| JP | 06-318160 A | 11/1994 |
| JP | 2005-004404 A | 1/2005 |
| JP | 2013-232142 A | 11/2013 |
| WO | 2012/035630 A1 | 3/2012 |
| WO | 2013/051145 A1 | 4/2013 |
| WO | 2013/140512 A1 | 9/2013 |

OTHER PUBLICATIONS

Extended European Search Report received in corresponding European Application No. 14878366.5 dated Aug. 4, 2017.

* cited by examiner

REDUNDANT SYSTEM AND REDUNDANT SYSTEM MANAGEMENT METHOD

TECHNICAL FIELD

The present invention relates to a redundant system and a redundant system management method.

BACKGROUND ART

The mission-critical system which must not go down easily, such as a mission-critical system of a financial institution, for example, is generally configured as a cluster, that is to say, a redundant system. Such a redundant system is operated in such a way that an active-system apparatus and a standby-system apparatus mutually monitor each other, and the standby system is switched to serve as an active system in response to detection of an anomaly in the active system.

As a technique of monitoring and operating a redundant system described above, the following techniques have been proposed, for example. To be specific, in one example of the proposed techniques, a client terminal executes the steps of: accessing a dual network management system to obtain a monitoring program for monitoring a system switching; activating the obtained monitoring program; and causing the activated monitoring program to periodically access the dual network management system and to detect a switching of the network management system from a response from the network management system (see Patent Literature 1).

CITATION LIST

Patent Literature

[PTL 1] Japanese Patent Application Publication No. 2005-4404

SUMMARY OF INVENTION

Technical Problem

Currently, many systems are configured with redundancy by including the active system and the standby system indeed. Meanwhile, such redundancy has not been introduced to a mechanism to play a role to detect an anomaly and perform system switching in response to the detection. For this reason, if a failure occurs in that mechanism, the redundant system operates without performing an anomaly detection operation therein, and even a trigger for a system switching operation is not generated. As a result, the redundant system may stop providing services without taking any countermeasure. In other words, there remains concern that the mechanism for anomaly detection and system switching may be a single point of failure, and may fundamentally damage the effect of the system redundancy established by the active system and the standby system.

Against this background, an object of the present invention is to provide a technique of providing a redundant failure detection configuration to a redundant system, and thereby enabling the redundant system to precisely detect a failure occurrence, and reliably execute a necessary system switching operation.

Solution to Problem

In a redundant system of the present invention to solve the foregoing problem, each of power supply mechanisms provided for respective computers redundantly provided includes a processor configured to: monitor a write process in which predetermined information received from another apparatus or another mechanism in the corresponding computer is written to a storage of the power supply mechanism; if the write process is not in conformity with a predetermined rule, execute a power-off or reset operation; and after the execution of the operation, give an instruction to perform a fail-over operation to the other computer out of the computers. It should be noted that each of the aforementioned computers naturally also includes a mutual monitoring function conventionally provided by clustering software in the redundant system (the same applies below).

In addition, a redundant system management method of the present invention is to be executed by each of power supply mechanisms provided for respective computers redundantly provided, and includes: monitoring a write process in which predetermined information from another apparatus or another mechanism of the corresponding computer is written to a storage of the power supply mechanism; executing a power-off or reset operation if the write process is not in conformity with a predetermined rule; and after the execution of the operation, giving an instruction to perform a fail-over operation to the other computer out of the computers.

Advantageous Effects of Invention

According to the present invention, the redundant system further includes the monitoring functions in the power supply mechanisms, in addition to the mutual monitoring functions which are conventionally provided by the clustering software in the redundant system. With this configuration, the redundant system is provided with the redundant failure detection configuration, and is enabled to precisely detect a failure occurrence, and reliably execute a necessary system switching operation.

BRIEF DESCRIPTION OF DRAWINGS

FIG. 4 is a diagram illustrating a configuration example of a monitor table of the first embodiment.

DESCRIPTION OF EMBODIMENTS

Figure 1:
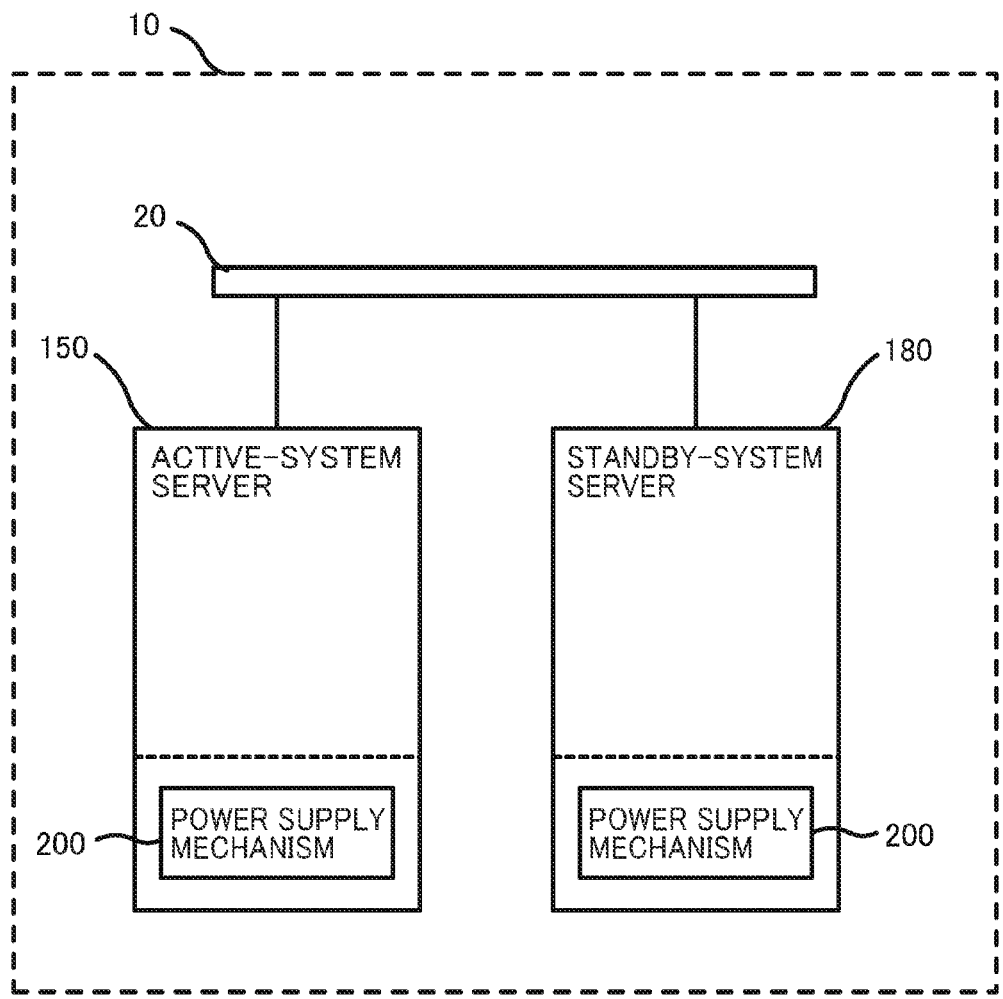
FIG. 1 is a diagram illustrating a configuration example of a network including a redundant system of a first embodiment.

Hereinafter, embodiments of the present invention are described in details with reference to the drawings. FIG. 1 is a diagram illustrating a configuration example of a network including a redundant system 10 of a first embodiment. The redundant system 10 illustrated in FIG. 1 is a computer system that includes a failure detection mechanism with redundancy, and therefore is enabled to precisely detect a failure occurrence and reliably execute a necessary system switching operation.

One example of the redundant system 10 assumed herein is a mission-critical system operated in a financial institution. As a matter of course, the redundant system 10 is not limited to a system in a financial institution, but may be assumed to be various kinds of server systems (each configured as a cluster with redundancy) in any other business fields.

The redundant system 10 includes an active-system server 150 configured to execute business task processes in normal times, and a standby-system server 180 configured to operate in place of the active-system server 150 when an anomaly occurs in the active-system server 150. The active-system server 150 and the standby-system server 180 are communicatively coupled to each other via a network 20, and constitute a redundant system in accordance with already-existing clustering software. In addition, power supply mechanisms 200 to provide power supply for operation are attached to the active-system server 150 and the standby-system server 180, respectively. The power supply mechanisms 200 are coupled to their respective power supply targets, i.e., the active-system server 150 and the standby-system server 180 with connectors for performing power supply of predetermined voltages and communications, but are of hardware configured separately from these servers.

Figure 2:
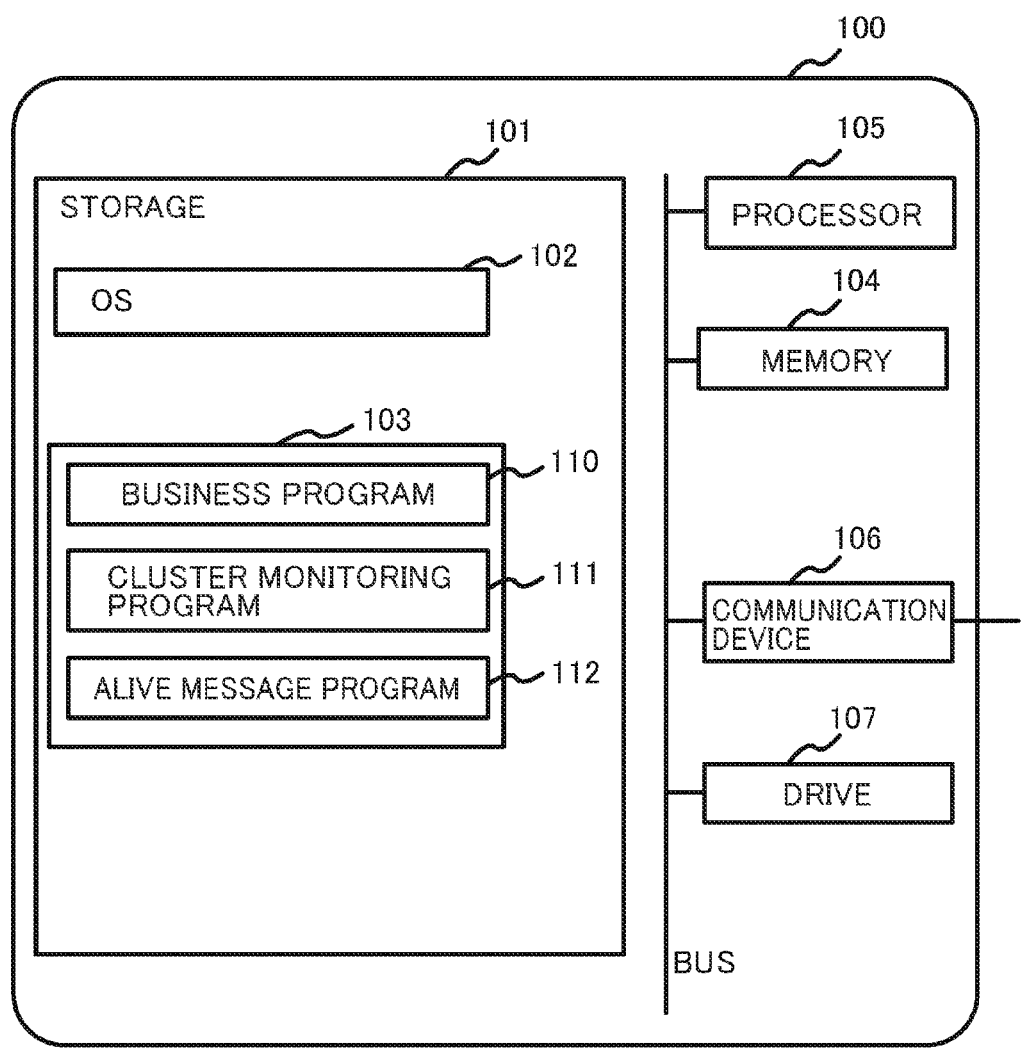
FIG. 2 is a diagram illustrating a configuration example of a server of the first embodiment.

Next, description is provided for hardware configurations of the active-system server 150 and the standby-system server 180 constituting the redundant system 10. Hereinafter, the active-system server 150 and the standby-system server 180 are referred to as a general term, server 100, unless they have to be particularly distinguished from each other. FIG. 2 is a configuration example of the server 100 of the first embodiment.

The server 100 constituting the redundant system 10 includes: a storage 101 formed of a proper non-volatile storage device such as a hard disk drive; a memory 104 formed of a volatile storage device such as a RAM; a processor 105 such as a CPU that activates an OS (operating system) 102 retained in the storage 101, and executes programs 103 as needed by loading and doing the like to perform overall control of the server itself and to perform various kinds of processes for determination, computation and control; a communication device 106 that is coupled to the network 20 and performs communication processes with other apparatuses; and a drive 107 that is a reader for portable media.

Note that the storage 101 stores therein the OS 102 and programs 103 to implement functions necessary for the server 100 constituting the redundant system 10. The programs 103 include a business program 110, a cluster monitoring program 111, and an alive message program 112. Among them, the business program 110 is a program for executing processes for predetermined business tasks in the financial institution. The cluster monitoring program 111 is an existing program for causing the active-system server and the standby-system server to execute mutual anomaly monitoring, and is included in existing clustering software. Then, the alive message program 112 is a program for executing a write process of writing predetermined information to a storage 201 of the power supply mechanism 200.

In this case, the processor 105 of the server 100 implements a cluster monitoring function by executing the aforementioned cluster monitoring program 111. The cluster monitoring function is resident in each of the active-system server 150 and the standby-system server 180, and enables the server to perform a conventional operation, such as heartbeats, of mutually monitoring whether the other server is alive or dead.

In addition, the processor 105 of the server 100 implements an alive message function by executing the foregoing alive message program 112. The alive message function is resident in each of the active-system server 150 and the standby-system server 180, and enables an operation of: acquiring predetermined information, for example, current time information, i.e., a time stamp at regular time intervals from a clock function or the like of the OS 102; and sending the acquired information to the corresponding power supply mechanism 200 via an internal signal line 30.

Here, it is preferable that the OS 102 and a predetermined program in the server 100 monitor an operation status of the alive message function by the aforementioned alive message program 112, and, if detecting some kind of trouble event such as a slowdown or halt in the alive message function, reactivate the alive message function by re-executing the alive message program 112 within a predetermined time from the detection. With this operation, the alive message function having a trouble can be restored immediately, and the write process can be restarted rapidly. This operation can adequately avoid a situation where, even though any of the servers 100 constituting the redundant system 10 actually has no trouble occurring in its original functions per se (such as the functions implemented by the OS 102 and the business program 110), the system switching is executed in response to failure detection attributed to a trouble only in the foregoing function for the write process.

Figure 3:
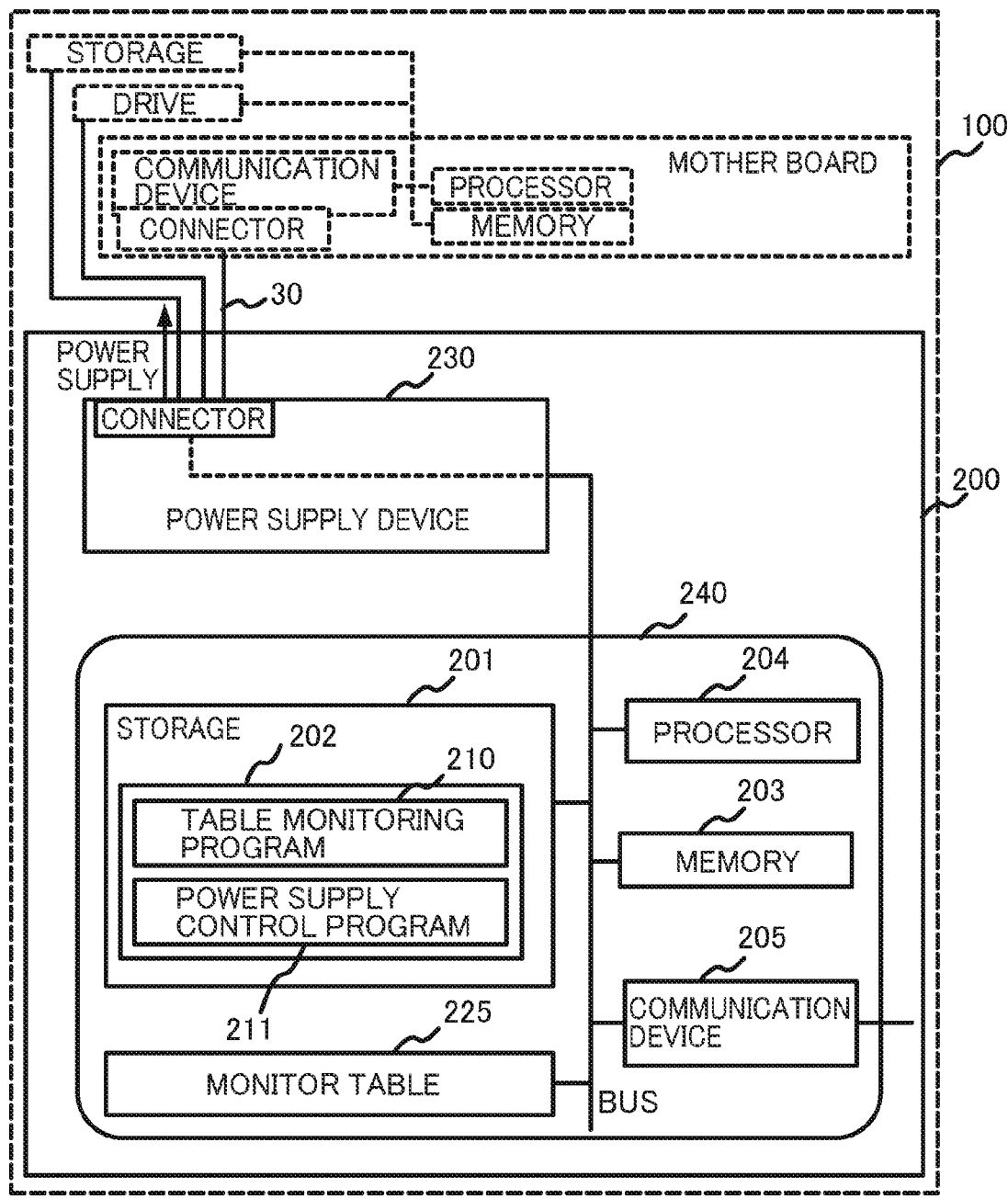
FIG. 3 is a diagram illustrating a configuration example of a power supply mechanism of the first embodiment.

Next, the following description is provided for a hardware configuration of the power supply mechanism 200 attached to the aforementioned server 100, more specifically, each of the active-system server 150 and the standby-system server 180, and configured to provide power supply for operation. FIG. 3 is a diagram illustrating a configuration example of the power supply mechanism 200 of the first embodiment.

This power supply mechanism 200 includes: a power supply device 230 including a transformer, a fuse, a cooling fan, a heat sink, and the like, which are generally included in a power supply unit for a computer; and a power supply control device 240 configured to perform on-off control of the power supply device 230.

Out of them, the power supply device 230 is a device coupled via certain cables to a connector on a mother board in the aforementioned server 100 and to connectors of the storage 230 and the drive 107 as the reader for portable media, and configured to supply predetermined direct current voltages to them. It should be noted that a weak standby current always flows into one of the aforementioned cables, and the cable plays a role as a signal line to transmit control signals such as wake-up on LAN (WOL) signals from a chip-set side of the power supply target server 100 to the power supply control device 240. In this embodiment, this line is referred to as the internal signal line 30.

Meanwhile, the power supply control device 240 is formed of a baseboard management controller (BMC) that is a system management controller including a certain processor. In general, this BMC has a function to always monitor various kinds of conditions in the power supply device 230, such as a supply voltage, a rotation speed of the cooling fan, and temperatures of the various parts of the server 100 including the CPU (processor 105), and to notify the OS 102 of the monitored conditions. Even if the server itself is powered off, this BMC, namely, the power supply control device 240 is supplied with power and is kept operating as long as an adequate power source such as a commercial power supply is coupled to the power supply device 230. In other words, the power supply control device 240 is configured to be independent from the higher-level software such as the OS 102 in the power supply target server 100.

The above BMC, that is, the power supply control device 240 includes a storage 201 formed of a proper non-volatile storage device such as a ROM; a memory 203 formed of a volatile storage device such as a RAM; a processor 204 serving as a processor that executes programs 202 retained in the storage 201 by loading the programs 202 to the memory 203 and doing the like to perform overall control of the device itself and to perform various kinds of processes for determination, computation and control; and a communication device 205 that is coupled via the aforementioned internal signal line 30 to the chip set of the power supply target server 100, and performs communications with the OS 102 of the server 100.

The storage 201 of the power supply mechanism 200 stores therein the programs 202 for implementing functions necessary for the power supply mechanism 200, and a monitor table 225. Out of them, the programs 202 include a table monitoring program 210 and a power supply control program 211. The table monitoring program 210 is a program to: repeat an operation of performing the write process in which the predetermined information, for example, the time stamp sent from the alive message function in the aforementioned server 100 via the internal communication line 30 is written to the monitor table 225, and resetting a predetermined timer at every execution of the write process; and to repeatedly determine whether or not the information in the monitor table 225 is updated within a certain fixed time. Meanwhile, the power supply control program 211 is a program to execute an operation of powering off or resetting the power supply device 230 in response to a notification from the table monitoring program 210, and after the execution of the operation, instruct the standby-system server 180 to perform a fail-over operation. The power-off or reset function of the power supply control program 211 is the same as a general power supply control function in the BMC.

The processor 204 of the power supply control device 240 executes the aforementioned table monitoring program 210 to implement the table monitoring function. Then, the processor 204 of the power supply control device 240 executes the aforementioned power supply control program 211 to implement the power supply control function.

In this case, the table monitoring function is resident in the power supply mechanism 200, and executes the following operation. Specifically, here assume that what is sent from the alive message function in the server 100 is a time stamp, for example. In this case, at every reception of the time stamp via the internal signal line 30, the table monitoring function successively updates the monitor table 225 by writing the time stamp thereto. In addition, the table monitoring function activates a timer every time the time stamp is updated, thereby monitors whether or not the update of the time stamp in the monitor table 225 is performed within the fixed time, and makes determination based on a rule that the update of the time stamp within the fixed time should be performed successively. If the table monitoring function detects, as a result of the determination, a time point until which the time stamp has not been updated within the fixed time, the table monitoring function recognizes that the write process to be performed by the server 100, specifically, the OS 102 is delayed, and instructs the aforementioned power supply control function to power off or reset the power supply device 230.

Figure 4:
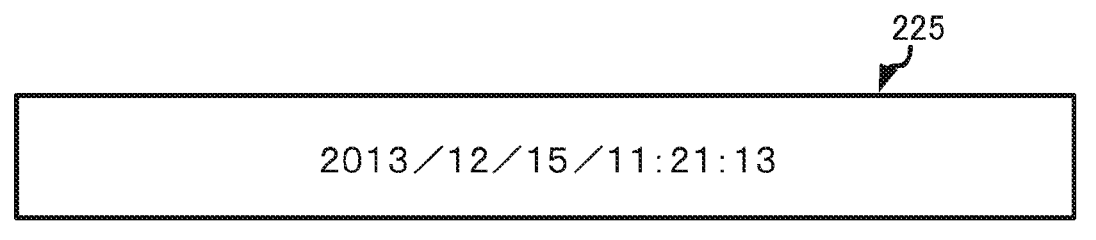

Here, as illustrated in FIG. 4, the time stamp is cited as an example of the information written to the monitor table 225 in the aforementioned write process. Besides, any of various kinds of information such as a particular fixed value that is kept unchanged throughout all the write process occasions or a numeric value that is incremented at every write process occasion may be employed depending on a rule determined as needed.

In the case where the particular fixed value (for example: 1) kept unchanged throughout all the write process occasions is received from the aforementioned alive message function and is written to the monitor table 225, the table monitoring function updates and overwrites the fixed value with another predetermined value (for example: 0) within a predetermined time after every time the fixed value is written. The table monitoring function activates a timer every time this overwrite update is performed, and makes determination based on a rule that the overwrite update should be executed within a fixed time. If the table monitoring function detects a time point until which the aforementioned overwrite update has not been executed within the fixed time, the table monitoring function recognizes that the write process to be performed by the server 100, specifically, the OS 102 is delayed, and instructs the aforementioned power supply control function to power off or reset the power supply device 230.

In the case where the numeric value incremented at every write process occasion is written to the monitor table 225, the table monitoring function activates a timer every time the numeric value received form the aforementioned alive message function is written, and makes determination based on a rule that the further-incremented numeric value should be written within the fixed time. If the table monitoring function detects a time point until which the aforementioned numeric value writing has not been written within the fixed time, the table monitoring function recognizes that the write process to be performed by the server 100, specifically, the OS 102 is delayed, and instructs the aforementioned power supply control function to power off or reset the power supply device 230.

Incidentally, a combination of the table monitoring function by the table monitoring program 210 and the monitor table 225 described above may be regarded as what is termed as a watchdog timer.

Hereinafter, an actual procedure of a redundant system management method of the present embodiment is described with reference to the drawings. Operations involved in the redundant system management method to be described below are carried out by the programs executed by each of the aforementioned servers 100 and power supply mechanisms 200 constituting the redundant system 10. Then, the programs are configured of codes for executing the following operations.

Figure 5:
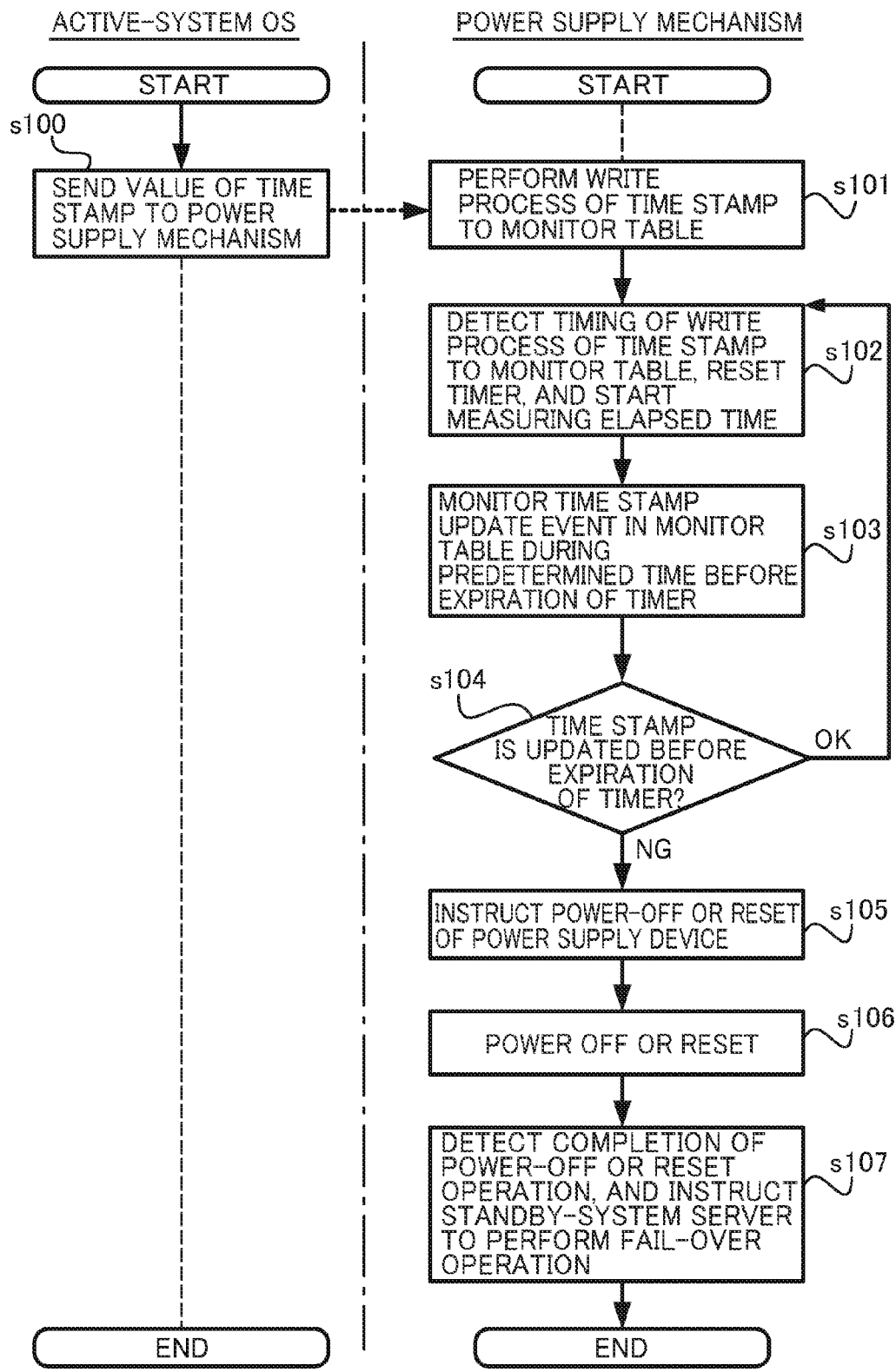
FIG. 5 is a flowchart presenting a processing procedure example 1 of a redundant system management method of the first embodiment.

FIG. 5 is a flowchart presenting a processing procedure example 1 of the redundant system management method in the present embodiment. Here, assume a situation where the active-system server 150 in the redundant system 10 is continuously executing predetermined business task processes in the financial institution in accordance with the business program 110, and the active-system server 150 and the standby-system server 180 are mutually performing the conventional alive/dead state monitoring using heartbeats by the cluster monitoring functions in accordance with the cluster monitoring programs 111. In addition, assume the situation where, in parallel to the conventional alive/dead state monitoring by the cluster monitoring functions, the aforementioned alive message function resident in each of the active-system server 150 and the standby-system server 180 sends the time stamp to the corresponding power supply mechanism 200 via the internal signal line 30 at regular time intervals.

Under this situation, the active-system server 150 sends a value of the time stamp issued by its own resident alive message function, from the connector on the mother board of the active-system server 150 to the power supply control device 240 of the power supply mechanism 200 via the internal signal line 30 (s100).

Meanwhile, the power supply control device 240 of the power supply mechanism 200 performs the write process on the monitor table 225 of the storage 201 by writing the aforementioned time stamp sent from the alive message function of the active-system server 150 (s101). At the same time, the table monitoring function by the table monitoring program 210 detects the timing of the write process of the time stamp to the monitor table 225, and resets a timer to start measuring an elapsed time in response to the detection, the timer configured to expire after a predetermined time (s102).

By means of the aforementioned table monitoring function, the power supply control device 240 in the state where the aforementioned timer is activated monitors the next write process of the time stamp to the monitor table 225, or in short an update event during a predetermined time before the expiration of the timer (s103). If a new time stamp is sent from the alive message function and the time stamp in the monitor table 225 is updated during the monitoring before the expiration of the timer (s104: OK), the power supply control device 240 returns the processing to step s102 in response to the time stamp update, and restarts the measurement of the elapsed time by resetting the aforementioned timer.

On the other hand, if no new time stamp is sent from the alive message function and the time stamp in the monitor table 225 is not updated during the monitoring before the expiration of the timer (s104: NG), the table monitoring function of the power supply control device 240 recognizes that there has occurred a certain failure that stops the active-system server 150, i.e., the OS 102 from issuing the time stamp, and instructs the power supply control function by the power supply control program 211 to power off or reset the power supply device 230 (s105). The power supply control function having received the power-off or reset instruction powers off or resets the power supply device 230 (s106). The operation of powering off or resetting the power supply device 230 is the same as the conventional power-supply control operation.

Through the power supply control function, the power supply control device 240 detects the completion of the aforementioned power-off or reset operation of the power supply device 230, and gives an instruction to perform a fail-over operation to the standby-system server 180 via the internal signal line 30 and the network 20 (s107). Upon receipt of this instruction, the standby-system server 180 immediately takes over the business task processes from the active-system server 150 and starts operating as a new active system in accordance with the same procedure as the conventional one.

Note that, there may also be a case where the conventional cluster monitoring function detects the occurrence of an anomaly in the alive/dead state monitoring by the conventional cluster monitoring function. In this case, independently of the foregoing operation flow in which the time stamp update in the monitor table 225 is monitored, another operation flow is executed in which the standby-system server 180 operates as a new active system in place of the active-system server 150 as in step s107. This processing is the same as the conventional one, and the description thereof is omitted herein. Thus, either one of the operation flows in which the occurrence of an anomaly is detected earlier executes the processing leading to the fail-over operation by the standby-system server 180.

In addition, there may be a case where only the alive message function by the alive message program 112 has a trouble while no anomaly occurs in the original functions by the OSs 102 and the others in the active-system server 150 and the standby-system server 180, and the hardware implementing these functions. In this case, unless a particular operation responsive to that case is executed, none of the aforementioned operations of sending the time stamp and updating the time stamp in the monitor table 225 following the sending is executed with the result that the meaningless fail-over operation may be executed.

Figure 6:
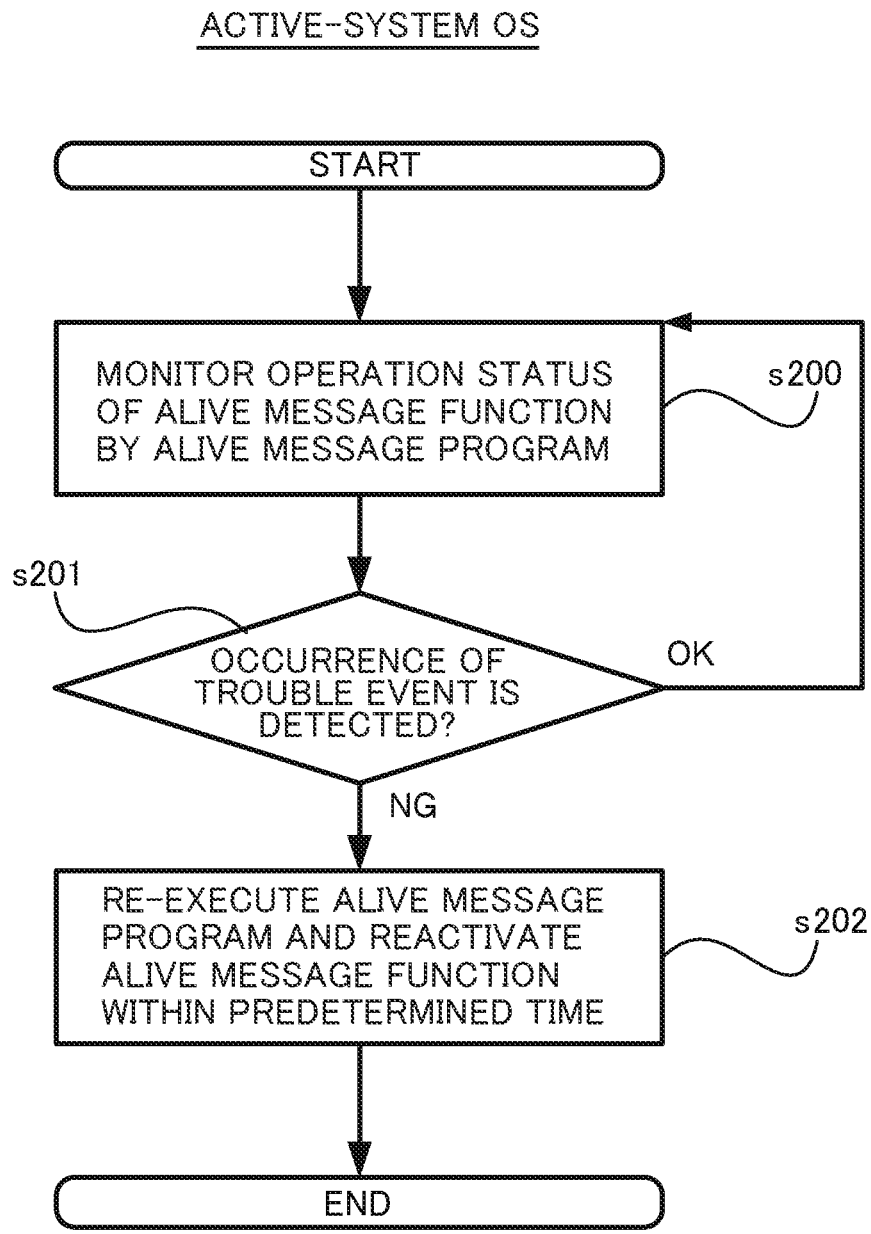
FIG. 6 is a flowchart presenting a processing procedure example 2 of the redundant system management method of the first embodiment.

To address this, as presented in a flow of FIG. 6, the OS 102 and a predetermined program of each of the active-system server 150 and the standby-system server 180 always monitor the operation status of the corresponding alive message function by the aforementioned alive message program 112 (s200). If the alive message function is detected having some kind of trouble event such as a slowdown or halt occurring (s201: Y), the alive message program 112 is re-executed to reactivate the alive message function within a predetermined time (s202). This series of processing is executed in parallel to the processing in the aforementioned steps s100 to s107.

By executing this operation, the alive message function having a trouble occurring therein can be restored immediately, and the processing of issuing the time stamp and updating the time stamp in the monitor table 225 can be restarted rapidly.

Figure 7:
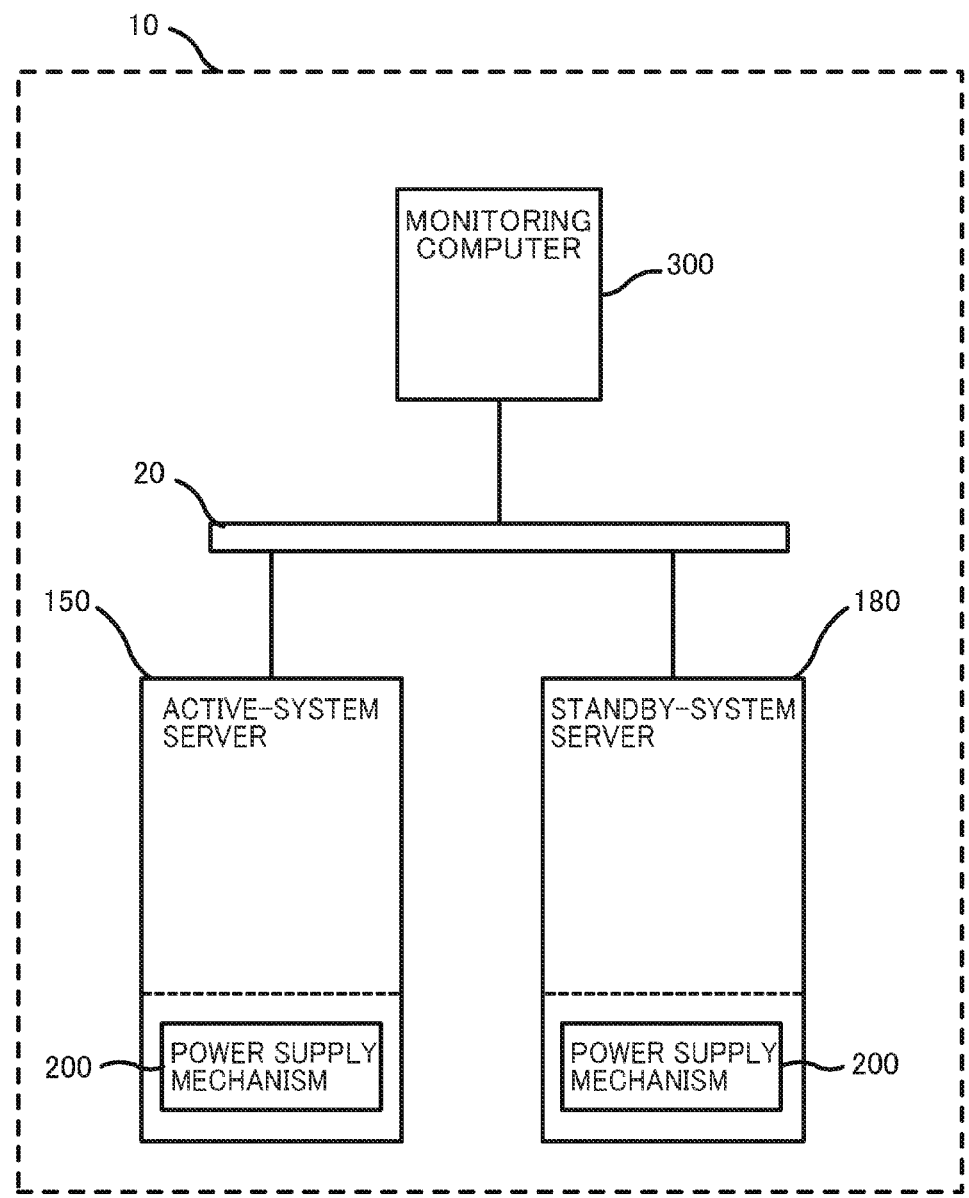
FIG. 7 is a diagram illustrating a configuration example of a network including a redundant system of a second embodiment.

Next, description is provided for a second embodiment, which is different from the first embodiment in that a monitoring computer 300 capable of performing communications with an active-system server 150 and a standby-system server 180 via a network 20 implements an alive message function as illustrated in FIG. 7.

Figure 8:
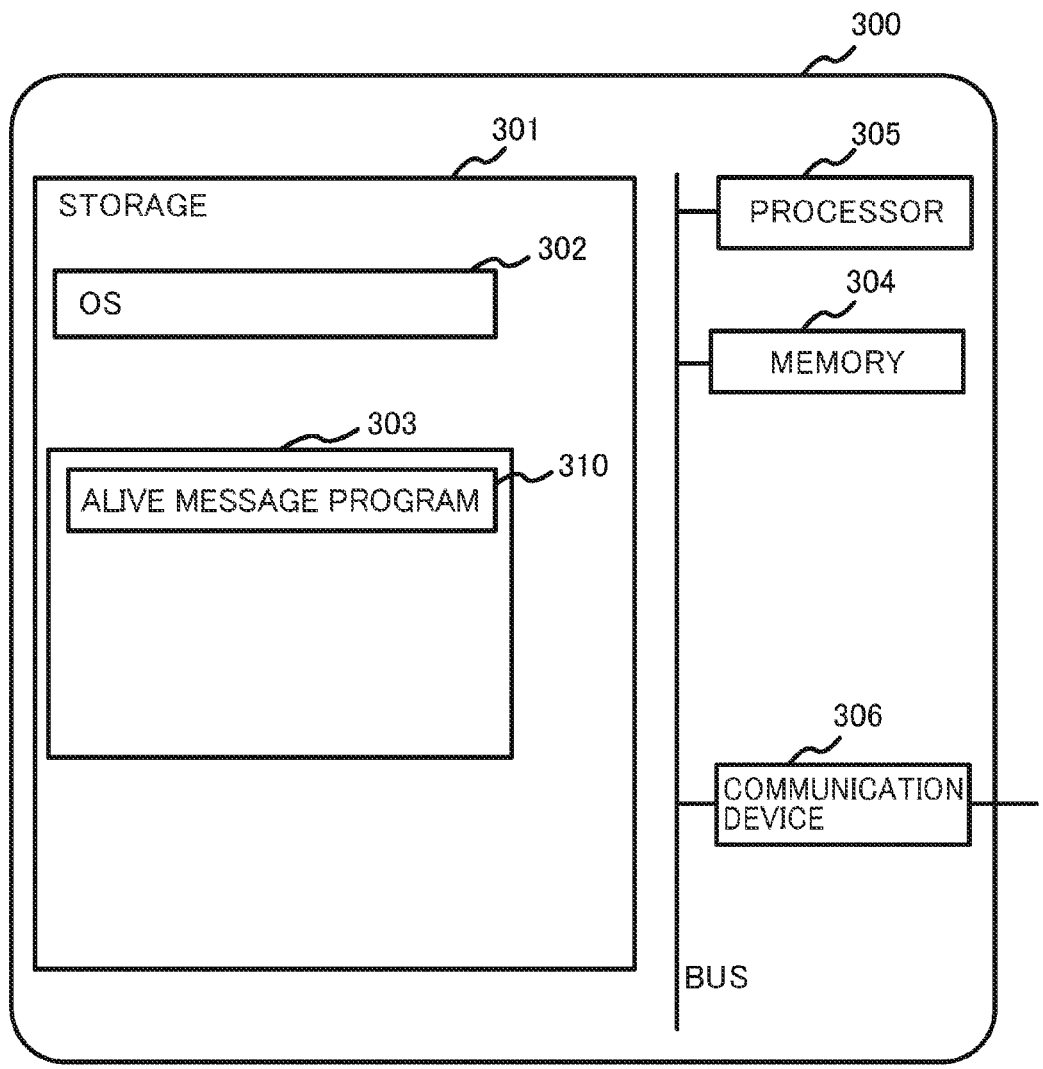
FIG. 8 is a diagram illustrating a configuration example of a monitoring computer of the second embodiment.

In this case, a hardware configuration of the monitoring computer 300 is as follows. FIG. 8 is a diagram illustrating a configuration example of the monitoring computer 300 of the second embodiment. The monitoring computer 300 includes: a storage 301 formed of a proper non-volatile storage device such as a hard disk drive; a memory 304 formed of a volatile storage device such as a RAM; a processor 305 such as a CPU that activates an OS (operating system) 302 retained in the storage 301, and that executes programs 303 as needed by loading and doing the like to perform overall control of the computer itself and to perform various kinds of processes for determination, computation and control; and a communication device 306 that is coupled to the network 20 and performs communication processes with the servers 100.

Here, the aforementioned programs 303 include an alive message program 310. This alive message program 310 is a program to repeatedly send a write request to write the time stamp to the aforementioned monitor table 225 of the power supply mechanism 200 to the active-system server 150 and the standby-system server 180 at predetermined intervals.

In this case, the processor 305 of the monitoring computer 300 executes the aforementioned alive message program 310 to implement the alive message function. The alive message function is resident in the monitoring computer 300, and enables an operation of acquiring predetermined information, for example, current time information, namely, a time stamp at regular time intervals from a clock function or the like of the OS 302, and sending the write request including the acquired information to the active-system server 150 and the standby-system server 180 via the network 20.

Figure 9:
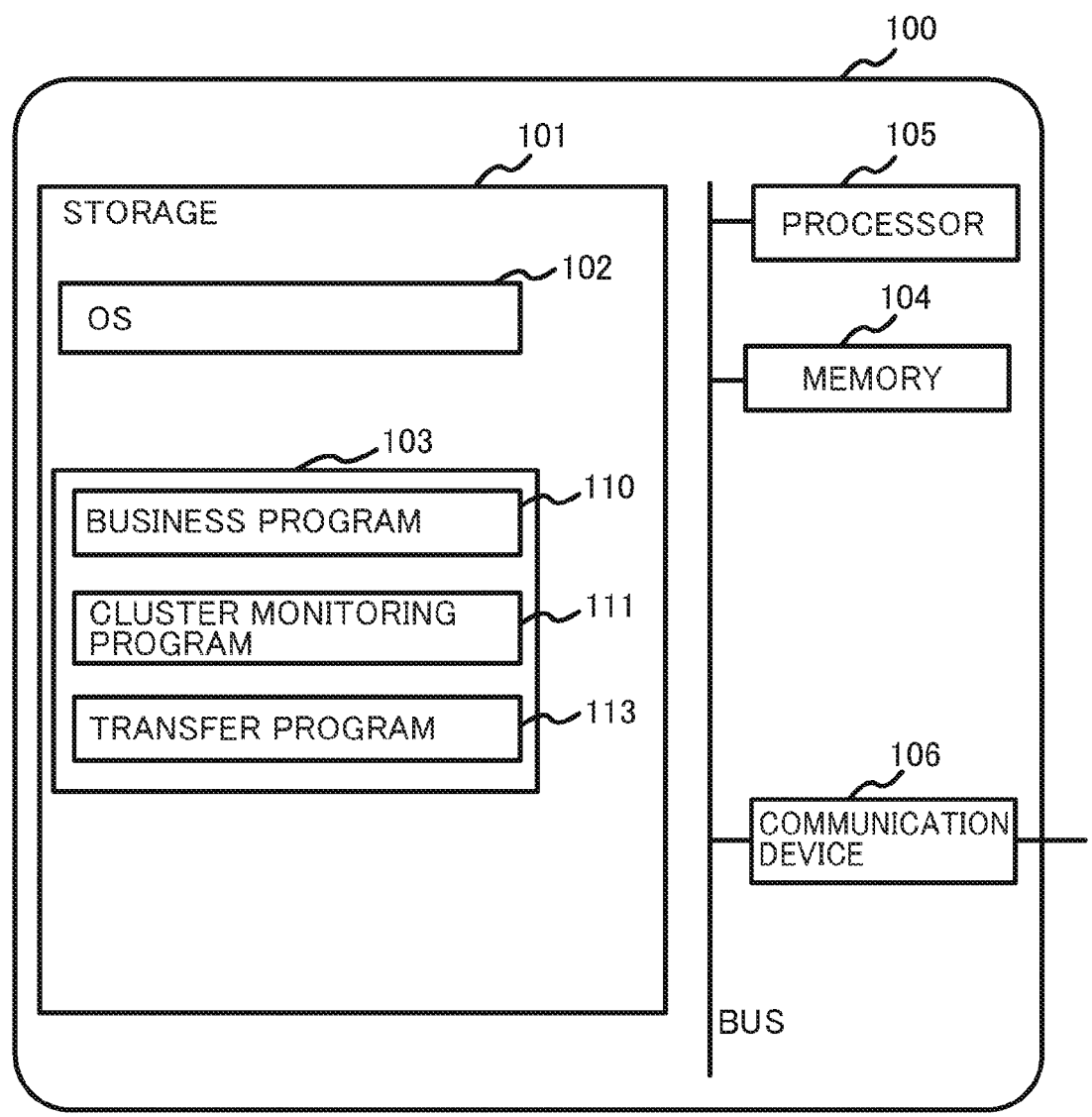
FIG. 9 is a diagram illustrating a configuration example of a server of the second embodiment.

Each of the active-system server 150 and the standby-system server 180 in this system configuration transfers the write request to the corresponding power supply mechanism 200 at every reception of the write request from the monitoring computer 300. This process of transferring the write request is executed by a transfer program 113 in each of the active-system server 150 and the standby-system server 180. In the second embodiment, a hardware configuration of the active-system server 150 and the standby-system server 180, that is, the server 100 is as illustrated in FIG. 9, and is the same as that of the first embodiment except that the alive message program 112 is not retained but the transfer program 113 is retained.

In addition, as in the first embodiment, the following operation is preferable. Specifically, the OS 302 and a predetermined program of the monitoring computer 300 always monitor the operation status of the alive message function by the aforementioned alive message program 310. Then, if the alive message function is detected having some kind of trouble event such as a slowdown or halt occurring, the alive message program 310 is re-executed to reactivate the alive message function within a predetermined time. By executing this operation, the alive message function having a trouble occurring therein can be restored immediately, and the write process can be restarted rapidly.

Meanwhile, a hardware configuration of the power supply mechanism 200 is the same as the configuration in the first embodiment, and the description thereof is omitted herein.

Figure 10:
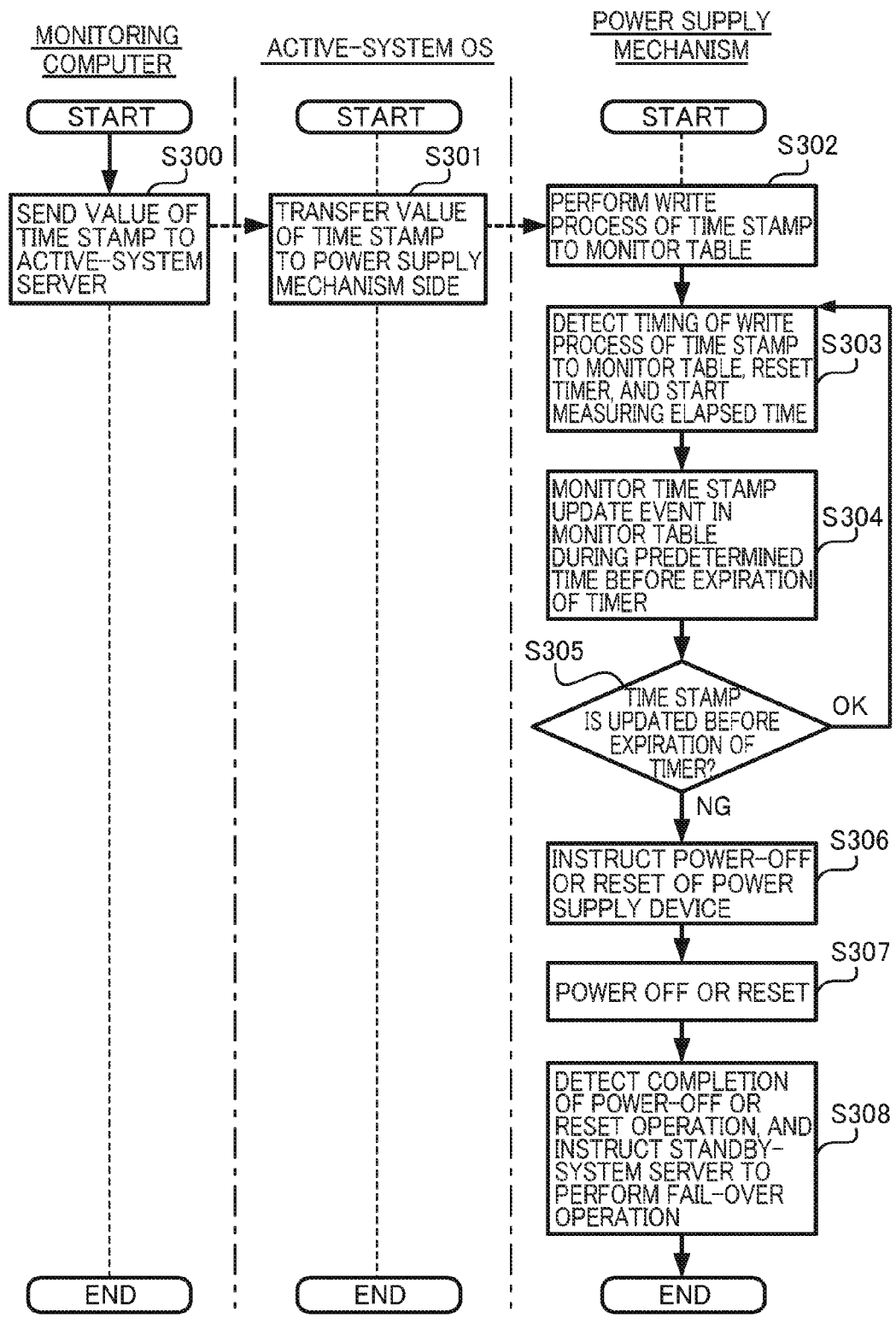
FIG. 10 is a flowchart presenting a processing procedure example 1 of a redundant system management method of the second embodiment.

Next, a redundant system management method in the second embodiment is described. FIG. 10 is a flowchart presenting a processing procedure example 1 of the redundant system management method in the second embodiment. Here, assume a situation where the active-system server 150 in the redundant system 10 is continuously executing predetermined business task processes in the financial institution in accordance with the business program 110, and the active-system server 150 and the standby-system server 180 are mutually performing the conventional alive/dead state monitoring using heartbeats by the cluster monitoring functions in accordance with the aforementioned cluster monitoring programs 111. In addition, assume the situation where, in parallel to the conventional alive/dead state monitoring by the cluster monitoring functions, the aforementioned alive message function resident in the monitoring computer 300 sends the aforementioned write request to the active-system server 150 via the network 20 at regular time intervals.

Under this situation, the monitoring computer 300 sends a value of the time stamp issued by its own resident alive message function, to the active-system server 150 via the network 20 by using the communication device 306 (s300).

On the other hand, the active-system server 150 receives the write request from the monitoring computer 300, and transfers the write request by means of a transfer function by the aforementioned transfer program 113 from the connector on the motherboard of the active-system server 150 to the power supply control device 240 of the power supply mechanism 200 via the internal signal line 30 (s301).

The power supply control device 240 in the power supply mechanism 200 receives the write request sent from the aforementioned transfer function of the active-system server 150, and performs a write process of writing the time stamp indicated in the write request to the monitor table 225 of the storage 201 (s302). In addition, the power supply control device 240 detects the timing of the write process of the time stamp to the monitor table 225 by means of the table monitoring function by the table monitoring program 210, and starts measuring an elapsed time in response to the detection by resetting a timer which expires after a predetermined time (s303).

The power supply control device 240 in the state where the aforementioned timer is activated monitors the next write process of the time stamp to the monitor table 225, or in short an update event, by using the aforementioned table monitoring function, during the predetermined time before the expiration of the timer (s304). If a new time stamp is sent from the transfer function and the time stamp in the monitor table 225 is updated during the monitoring before the expiration of the timer (s305: OK), the power supply control device 240 returns the processing to step s303 in response to the update of the time stamp, and restarts the measurement of the elapsed time by resetting the aforementioned timer.

On the other hand, if no new time stamp is sent from the transfer function and the time stamp in the monitor table 225 is not updated during the monitoring before the expiration of the timer (s305: NG), the table monitoring function of the power supply control device 240 recognizes that there occurs a certain failure that stops the active-system server 150, i.e., the OS 102 from transferring the write request from the monitoring computer 300, and instructs the power supply control function by the power supply control program 211 to power off or reset the power supply device 230 (s306). The power supply control function having received the power-off or reset instruction powers off or resets the power supply device 230 (s307). The operation of powering off or resetting the power supply device 230 is the same as the conventional power-supply control operation Through the power supply control function, the power supply control device 240 detects the completion of the aforementioned power-off or reset operation of the power supply device 230, and gives an instruction to perform the fail-over operation to the standby-system server 180 via the internal signal line 30 and the network 20 (s308). Upon receipt of this instruction, the standby-system server 180 immediately takes over the business task processes from the active-system server 150 and starts operating as a new active system in accordance with the same procedure as the conventional one.

Also, in the case where only the transfer function by the transfer program 113 has a trouble while no anomaly occurs in the original functions by the OS 102 and the others in the active-system server 150 and the standby-system server 180, and the hardware implementing these functions, none of the aforementioned operations of transferring the write request including the time stamp and updating the time stamp in the monitor table 225 following the transfer is executed, unless a particular operation responsive to that case is executed, with the result that a meaningless fail-over operation may be executed.

Figure 11:
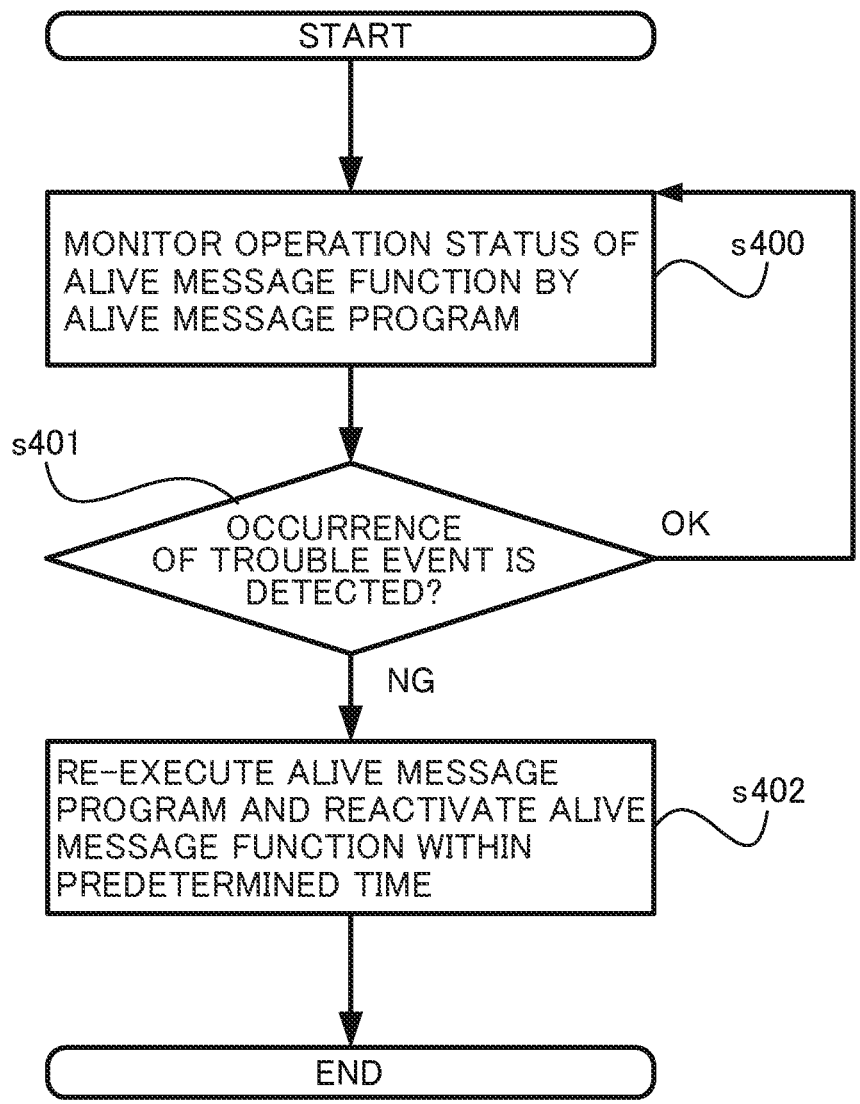
FIG. 11 is a flowchart presenting a processing procedure example 2 of the redundant system management method of the second embodiment.

To address this, as presented in a flow of FIG. 11, the OS 302 and a predetermined program of the monitoring computer 300 always monitor the operation status of the alive message function by the aforementioned alive message program 310 (s400). If the alive message function is detected having some kind of trouble event such as a slowdown or halt occurring (s401: Y), the alive message program 310 is re-executed to reactivate the alive message function within a predetermined time (s402). This series of processing is executed in parallel to the processing in the aforementioned steps s300 to s308.

By executing this operation, the alive message function having a trouble occurring therein can be restored immediately, and the processing of issuing the time stamp, sending the write request including the time stamp, and updating the time stamp in the monitor table 225 in response to the write request can be restarted rapidly.

Hereinabove, the most preferable embodiments and the like to carry out the present invention are described specifically. However, the present invention is not limited to them, but may be modified variously without departing from the spirit of the invention.

According to these embodiments, the redundant system further includes the monitoring functions implemented by the power supply mechanisms, in addition to the conventionally-provided mutual monitoring functions by the clustering software. Thus, the redundant system is equipped with a redundant failure detection configuration, and is enabled to precisely detect a failure occurrence, and thus to reliably execute a necessary system switching operation.

The description of the present specification clarifies at least the followings. Specifically, in a redundant system of an embodiment, the computers redundantly provided may each include a processor configured to execute the above write process to the storage of the corresponding power supply mechanism at the predetermined time intervals.

With this configuration, the write process to the storage of the power supply mechanism is executed at a regular frequency, and a discontinuation event of the write process or the like can be rapidly detected as an event out of conformity with a predetermined rule.

In addition, the redundant system of the embodiment may be configured as follows. Specifically, the processor in each of the computers redundantly provided performs the write process by writing current time information to the storage of the power supply mechanism at predetermined time intervals. A processor of the power supply mechanism reads the current time information written to the storage of the power supply mechanism at predetermined time intervals. If the current time information is not updated for a predetermined time or longer, the processor of the power supply mechanism executes a power-off or reset operation, and after the execution of the operation, gives an instruction to perform a fail-over operation to the other computer out of the computers.

With this configuration, it is possible to easily and reliably detect that each of the computers has any anomaly that stops the computer from performing the aforementioned write process, by determining whether or not the current time information, i.e., the time stamp in the storage of the corresponding power supply mechanism is updated within the fixed time.

Moreover, in the redundant system of the embodiment, the processor of each of the computers redundantly provided may reactivate a function to execute the write process in response to the detection of the occurrence of a predetermined event.

With this configuration, in response to the case where the function to execute the aforementioned write process (the function implemented by the alive message program) itself has some kind of trouble, the function can be reactivated, and thereby the write process can be restarted rapidly. This configuration makes it possible to avoid a situation where the system switching is executed due to failure detection attributed to a trouble only in the aforementioned function for the write process, even though the computers constituting the redundant system themselves do not have any trouble.

In addition, the redundant system of the embodiment may further include a monitoring computer including: a communication device configured to perform communications with the computers redundantly provided; and a processor configured to send a write request to each of the computers repeatedly at predetermined time intervals, the write request being a request to write the predetermined information to the storage of the power supply mechanism in conformity with the predetermined rule. At every reception of the write request from the monitoring computer, the processor of each of the computers redundantly provided may write the predetermined information indicated in the write request to the storage of the corresponding power supply mechanism.

With this configuration, an apparatus completely separate from the active-system and stand-by system computers constituting the redundant system, in short, the monitoring computer makes the request corresponding to the aforementioned write process. This makes the failure detection function independent of a situation where the active system and the standby system themselves have a failure or halt in their alive message programs, and therefore the failure detection function can be maintained more easily.

Further, the redundant system of the embodiment may be configured as follows. Specifically, the processor of the monitoring computer sends, as the write request, a request to write current time information to the storage of the power supply mechanism, to each of the computers at the predetermined time intervals. At every reception of the write request from the monitoring computer, the processor of each of the computers redundantly provided writes the current time information indicated in the write request to the storage of the power supply mechanism.

With this configuration, it is possible to easily and reliably detect that each of the computers has any anomaly that stops the computer from performing the write process in response to the write request originated from the aforementioned monitoring computer, by determining whether or not the current time information, i.e., the time stamp in the storage of the corresponding power supply mechanism is updated within the fixed time.

In addition, in the redundant system of the present embodiment, the processor of the monitoring computer may be configured to reactivate the function to execute the write request in response to the detection of the occurrence of a predetermined event.

With this configuration, in response to the case where the function to make the aforementioned write request (the function implemented by the alive message program) itself has some kind of trouble, the function can be reactivated, and thereby the write process can be restarted rapidly. This configuration makes it possible to avoid a situation where the system switching is executed due to failure detection attributed to a trouble in the monitoring computer, even though the computers constituting the redundant system themselves do not have any trouble.

REFERENCE SIGNS LIST 10 redundant system
20 network
30 internal signal line
100 server (computer)
101 storage
102 OS (operating system)
103 program
104 memory
105 processor
106 communication device
107 drive
110 business program
111 cluster monitoring program
112 alive message program
113 transfer program
150 active-system server
180 standby-system server
200 power supply mechanism
201 storage
202 program
203 memory
204 processor
205 communication device
210 table monitoring program
211 power supply control program
225 monitor table
230 power supply device
240 power supply control device
300 monitoring computer
301 storage
302 OS (operating system)
303 program
304 memory
305 processor
306 communication device
310 alive message program

The invention claimed is:

1. A redundant system comprising:
a pair of computers redundantly provided as an active computer coupled with a standby computer; and
a pair of power supply mechanisms, one of the power supply mechanisms coupled with the active computer and including a respective power supply device that supplies power to the active computer, and the other one of the power supply mechanisms coupled with the standby computer and including a respective power supply device that supplies power to the standby computer,
wherein the one of the power supply mechanisms coupled to the active computer includes a processor and a storage, and the processor is configured to:
monitor a write process in which predetermined information received from the active computer is written to the storage;
when the write process is not in conformity with a predetermined rule, execute a power-off or reset operation of the power supply device of the one of the power supply mechanisms coupled with the active computer; and
after the execution of the power-off or reset operation, give an instruction to perform a fail-over operation to the standby computer.

2. The redundant system according to claim 1, wherein the active computer includes a processor configured to execute the write process to the storage of the one of the power supply mechanisms coupled to the active computer.

3. The redundant system according to claim 2, wherein the processor of the active computer is further configured to:
execute the write process by writing current time information to the storage of the one of the power supply mechanisms coupled to the active computer as the predetermined information, and
wherein the processor of the one of the power supply mechanisms coupled to the active computer is further configured to:
read the current time information written to the storage,
when the current time information is not updated within a predetermined elapsed time as the predetermined rule, execute the power-off or reset operation, and
after the execution of the operation power-off or reset, give an instruction to perform the fail-over operation to the standby computer.

4. The redundant system according to claim 3, wherein the processor of the active computer is further configured to reactivate execution of the write process in response to detection of occurrence of a predetermined event.

5. A redundant system management method comprising:
providing a pair of computers redundantly provided as an active computer coupled with a standby computer, and a pair of power supply mechanisms, one of the power supply mechanisms coupled with the active computer and including a respective power supply device that supplies power to the active computer, and the other one of the power supply mechanisms coupled with the standby computer and including a respective power supply device that supplies power to the standby computer,
monitoring, by the one of the power supply mechanisms coupled with the active computer, a write process in which predetermined information from the active computer is written to a storage of the one of the power supply mechanisms o coupled with the active computer;
when the write process is not in conformity with a predetermined rule, executing a power-off or reset operation of the power supply device of the one of the power supply mechanisms coupled with the active computer; and
after the execution of the power-off or reset operation, giving an instruction to perform a fail-over operation to the standby computer.

6. The redundant system management method according to claim 5, further comprising:
after receiving the instruction to perform the fail-over operation, taking over predetermined processing by the standby computer from the active computer.

7. The redundant system according to claim 1, wherein the active computer and the standby computer each include a respective processor, and the processors of the active computer and the standby computer are configured to execute mutual alive/dead state monitoring using heartbeats.

8. The redundant system according to claim 1, wherein the processor of the standby computer is further configured to:
after receiving the instruction to perform the fail-over operation, take over predetermined processing from the active computer.

9. A redundant system comprising:

a pair of computers redundantly provided as an active computer coupled with a standby computer; and a pair of power supply mechanisms, one of the power supply mechanisms coupled with the active computer and including a respective power supply device that supplies power to the active computer, and the other one of the power supply mechanisms coupled with the standby computer and including a respective power supply device that supplies power to the standby computer; and a monitoring computer coupled with the active computer and the standby computer, wherein the monitoring computer includes a processor configured to send, to the active computer, a write request to write predetermined information, wherein the one of the power supply mechanisms coupled to the active computer includes a processor and a storage, and the processor is configured to:

monitor a write process in which the predetermined information received from the active computer is written to the storage;

when the write process is not in conformity with a predetermined rule, execute a power-off or reset operation of the power supply device of the one of the power supply mechanisms coupled with the active computer; and after the execution of the power-off or reset operation, give an instruction to perform a fail-over operation to the standby computer.

10. The redundant system according to claim 9, wherein the predetermined information is current time information, and wherein the predetermined rule is whether the current time information is not updated within a predetermined elapsed time.

11. The redundant system according to claim 10, wherein the processor of the monitoring computer is further configured to reactivate execution of the write process in response to detection of occurrence of a predetermined event.

12. The redundant system according to claim 9, wherein the active computer and the standby computer each include a respective processor, and the processors of the active computer and the standby computer are configured to execute mutual alive/dead state monitoring using heartbeats.

* * * * *